United States Patent Office 2,864,866
Patented Dec. 16, 1958

2,864,866
PROCESS FOR PREPARING SURFACE-ACTIVE MATERIALS

Rector P. Louthan, Bartlesville, Okla., assignor to Phillips Petroleum Company, a corporation of Delaware No Drawing. Application December 28, 1956
Serial No. 631,049

18 Claims. (Cl. 260—607)

This invention relates to detergent compositions, to their preparation from mercaptans and alkylene oxides, and to their use in cleansing materials comprising nylon and/or wool.

Alkylene oxide-mercaptan condensation products can be oxidized by means of hydrogen peroxide and/or peracids to the corresponding sulfoxides, said sulfoxides having excellent surface-active properties, and certain ones being excellent detergents for wool and/or nylon.

It is known that mercaptans can be condensed with alkylene oxides to produce compounds which are useful as detergents. This process employs an alkaline catalyst and is disclosed in detail in numerous patents, as for example, U. S. Patents 2,570,050; 2,494,610; and 2,720,543. These materials have not been completely satisfactory as detergents, though, since they have a strong, disagreeable odor, and are prone to discolor when stored for even moderate lengths of time, particularly in acid media.

Accordingly, it is an object of the invention to provide a process for making sulfoxides. Another object is to provide improved detergents and a process for their preparation. A further object is to provide an improved process for cleansing wool and/or nylon articles. Other objects of the invention will become apparent from the accompanying disclosure. It is now discovered that alkylene oxide-mercaptan condensation products can be oxidized to the corresponding sulfoxides, by a hydrogen peroxide or peracid oxidation, and the resulting sulfoxides are colorless, color-stable, and have excellent wetting properties and little odor.

It has also been discovered that compounds of the general formula:

wherein R is selected from the group consisting of (a) normal alkyl radicals containing from 12 to 16 carbon atoms and (b) tertiary alkyl radicals containing from 14 to 16 carbon atoms; and wherein $n$ is an integer in the range of 4 to 7, inclusive, are excellent detergents for nylon and wool.

The alkylene oxide-mercaptan condensation products, commonly referred to as glycol thioethers, which can be oxidized to the corresponding sulfoxides by the method of this invention can be represented by the formula

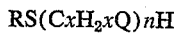

in which R is an aliphatic hydrocarbon radical containing from 8 to 20 carbon atoms, $x$ is an integer not less than 2, and ordinarily, though not necessarily, not greater than 5, and $n$ is an integer from 3 to 12.

Some examples of compounds of the above general formula which can be oxidized to the corresponding sulfoxides by the method of this invention are: the condensation product of 3 mols of ethylene oxide with tert-octyl mercaptan, the condensation product of 6 mols of ethylene oxide with n-nonyl mercaptan, the condensation product of 8 mols of propylene oxide with sec-decyl mercaptan, the condensation product of 11 mols of butylene oxide with n-hexadecyl mercaptan, and the condensation product of 12 mols of ethylene oxide with tert-eicosyl mercaptan. Further illustration of compounds may be found in the ensuing disclosure.

The glycol thioethers which can be oxidized to the corresponding sulfoxides by the method of this invention can be prepared by methods known in the art. Generally, this process of condensation comprises reacting the two reactants in the desired amounts in the presence of an alkaline catalyst. A particularly suitable catalyst is a solution of sodium hydroxide in methyl alcohol. Other alkaline catalysts effective in the process comprise the other alkali metal hydroxides, alkaline earth metal hydroxides, carbonates and alcoholates of sodium and potassium, and alkyl substituted ammonium hydroxides, such as tetraalkyl ammonium hydroxides. The reaction is ordinarily conducted at a temperature in the range of 120 to 300° F., although the optimum reaction conditions depend upon the specific reactants.

In carrying out the oxidation process of this invention, the preferred oxidizing agent is hydrogen peroxide, although the peracids are also effective. Peracids which may be used include peracetic acid, persulfuric acid ($H_2S_2O_8$), perboric acid, and perbenzoic acid. The hydrogen peroxide can be supplied to the reaction in aqueous solution containing from 3 to 100% $H_2O_2$ by weight. The amount of oxidizing agent employed can be in any amount within the range of 85 to 100% of theoretical, based on the glycol thioether being oxidized. The oxidation reaction can be carried out at any temperature between 32° F. and 122° F. (50° C.) The oxidation can be carried out in the absence of catalysts, but it is preferred to effect the oxidation in the presence of an acid catalyst. Mineral acids such as sulfuric acid and organic acids such as acetic acid are effective. The amount of catalyst which can be employed is in the range of 0.01 to 1.0% or more by weight based on the amount of glycol thioether being oxidized. In any event, the oxidation should be carried out in either neutral or acidic media, as basic conditions during oxidation cause color formation and substantially increase the odor of the sulfoxide product. In this light, it is advantageous to neutralize the mercaptan-alkylene oxide condensation product prior to oxidation, since the condensation reaction is generally catalyzed by alkaline materials.

The oxidation process of the present invention can be carried out either batchwise or in a continuous manner. After the oxidation is completed, the water present is removed by such methods as distillation and the like.

Although the names mercaptan-alkylene oxide condensation product or glycol thioether, used to distinguish the compounds being oxidized by the method of this invention, are generally accepted, exact chemical names for these materials can be written. For example, the condensation product of tert-dodecyl mercaptan with 6 mols of ethylene oxide can be correctly named as 17-hydroxy-3,6,9,12,15-pentaoxaheptadecyl tert-dodecyl sulfide.

The following specific examples are presented in order to illustrate the invention and the data presented are not to be construed as unnecessarily limiting the invention.

EXAMPLE I

A number of runs were made in which various mercaptans were condensed with ethylene oxide in various mol ratios. After the mercaptan-alkylene oxide condensation product of each run was prepared, this condensation product was oxidized by means of hydrogen peroxide, thus converting the thioether sulfur to the corresponding sulfoxide.

In these runs, the desired amount of desired mercaptan and the desired number of cubic centimeters of catalyst, a 20% by weight solution of NaOH in methyl alcohol, were charged to a pressure autoclave, which was equipped with a stirrer, a heater, a cooling coil, a thermometer, and a pressure gauge. Reactor contents were then heated to a temperature above 125° F., but below 280° F., the exact temperature being dependent upon the specific mercaptan being utilized, and ethylene oxide was pressured into the reactor until a pressure of approximately 50 p. s. i. g. was reached. Additional ethylene oxide was pressured into the reactor to maintain this pressure until the desired number of mols of ethylene oxide had been charged to the reactor. After the desired amount of ethylene oxide has been charged, the reaction was allowed to continue until the pressure had dropped to 0 p. s. i. g., indicating the reaction was complete. The reactor contents were then cooled, removed from the reactor and neutralized to a pH of 7.0 with aqueous 20% (by weight) sulfuric acid, utilizing a pH meter. Sodium sulfate precipitated out, and the liquid was decanted off. The results of these runs are presented in Table I.

Some of the oxidation runs were made using a catalyst while others were non-catalytic.

A portion of the neutralized alkalene oxide-mercaptan condensation product and an amount of a 30% by weight aqueous solution of hydrogen peroxide were then charged to a 500 cc., 3-necked flask which was fitted with a stirrer, thermometer, and dropping funnel. The amount of hydrogen peroxide employed was usually 100% of the theoretical amount required, although greater and lesser amounts were employed in several of the runs. The hydrogen peroxide was added dropwise over a period of approximately 5 minutes, and the temperature was held below 122° F. (50° C.) during the reaction by means of ice bath. The resulting mixture was stirred for about 1.5 to 3 hours after the addition of the hydrogen peroxide, and during this time, the temperature was maintained at about 122° F. After this stirring period, the contents of the flask were poured into a one-pint bottle and allowed to stand overnight at room temperature. The contents of the bottle were then tested for hydrogen peroxide by means of potassium iodide paper. If the test showed negative for $H_2O_2$, the oxidation was considered to be complete, while if the test was positive, the bottle was allowed to remain at room temperature until all of the

*Table I*

| Run No. | Mercaptan Used | Grams Mercaptan | Grams Ethylene Oxide | Mol Ratio, Ethylene Oxide/ Mercaptan | Pressure, p. s. i. g. | Max. Temp., —° F. | ccs. Catalyst | Grams Product [1] |
|---|---|---|---|---|---|---|---|---|
| 1 | tert-$C_{12}$ | 1,602 | 1,398 | 4/1 | 50 | 270 | 100 | 3,043 |
| 2 | tert-$C_{12}$ | 1,300 | 1,700 | 6/1 | 56 | 266 | 90 | 3,032 |
| 3 | tert-$C_{12}$ | 1,090 | 1,910 | 8/1 | 48 | 272 | 80 | 3,032 |
| 4 | tert-$C_{14}$ | 954 | 546 | 3/1 | 48 | 270 | 40 | 1,505 |
| 5 | tert-$C_{14}$ | 1,530 | 1,470 | 5/1 | 59 | 266 | 100 | 3,014 |
| 6 | tert-$C_{14}$ | 1,280 | 1,720 | 7/1 | 58 | 266 | 75 | 2,960 |
| 7 | tert-$C_{16}$ | 993 | 507 | 3/1 | 48 | 262 | 40 | 1,497 |
| 8 | tert-$C_{16}$ | 810 | 690 | 5/1 | 48 | 270 | 30 | 1,505 |
| 9 | tert-$C_{16}$ | 1,150 | 1,370 | 7/1 | 58 | 277 | 70 | 2,502 |
| 10 | n-$C_{12}$ | 534 | 466 | 4/1 | 49 | 260 | 25 | 985 |
| 11 | n-$C_{12}$ | 300 | 325 | 5/1 | 32 | 275 | 20 | 639 |
| 12 | n-$C_{12}$ | 433 | 567 | 6/1 | 49 | 270 | 20 | 998 |
| 13 | n-$C_{16}$ | 276 | 220 | 5/1 | 51 | 278 | 5 | 450 |
| 14 | n-$C_{18}$ | 565 | 435 | 5/1 | 48 | 268 | 20 | 1,005 |
| 15 | tert-$C_{12}$ | 1,435 | 1,565 | 5/1 | 50 | 265 | 90 | 3,006 |

[1] Excess in this column over amount of reactants represents water and/or alcohol remaining in the product.

EXAMPLE II

The marcaptan-alkylene oxide condensation products, prepared as described above, were then oxidized to the corresponding sulfoxides by the following procedure.

hydrogen peroxide had been used up. After the period at room temperature, if the material still gave a positive test for hydrogen peroxide, air was bubbled through the material at steam-bath temperature for approximately 2

*Table II*

| Run No.[1] | Grams of Condensation Product | Grams 30% by Wt. Aq. $H_2O_2$ | ccs. of Catalyst Used (20% by Wt. Aqueous $H_2SO_4$)— Except Where indicated | Yield of Sulfoxide | Cloud Point of 1% Aqueous Solu.—° F. |
|---|---|---|---|---|---|
| O-1 | 400 | 120 | 4 | 399.8 | 77 |
| O-2 | 400 | 97.2 | 4 | 403.8 | 145 |
| O-3 | 400 | 82.0 | 4 | 403.8 | 176 |
| O-4 | 400 | 125 | 5 | 385.6 | 70 |
| O-5 | 400 | 101 | 4 | 400.7 | 88 |
| O-6 | 400 | 84.3 | 4 | 399.1 | 133 |
| O-7 | 400 | 116 | 5 | 398.2 | 33 |
| O-8 | 400 | 95 | 5 | 400.7 | 138 |
| O-9 | 400 | 80 | 4 | 396.9 | 140 |
| O-10 | 400 | 100 | 5 | 402.2 | 147 |
| O-11 | 200 | 53.7 | None | 200.2 | 182 |
| O-12 | 400 | 97 | 5 | 403.1 | 196 |
| O-13 | 400 | 95 | 5 | 403.2 | 205 |
| O-14 | 400 | 89.5 | 5 | 402.5 | 205 |
| O-15 | 400 | 102 | 5 cc. of 20% NaOH in MeOH. | Not recovered | (²) |
| O-15a | 200 | 51 | None | 195.2 | 118.5 |

[1] Run O-4. In this run air was bubbled thru the solution for one week. Run O-10. The flask contents were heated to 198° F. for several minutes before being allowed to stand overnight. Runs 12 and 13. The charge for these runs contained 100 cc. of acetone. After all of the peroxide was added, the reactor contents were allowed to stand over a week end (about 65 hours). 300 cc. methyl alcohol were added, the mixture was refluxed for 3 hours, and the acetone and methyl alcohol were boiled out of solution. Water was then stripped out by the usual procedure. Run O-14. The charge for the run contained 200 cc. of acetone, and an additional 100 cc. of methyl alcohol was added midway during the addition of hydrogen peroxide. The oxidation was carried out as previously described, utilizing the method of runs 12 and 13 to remove the acetone and methyl alcohol.
² Yellow, insoluble oil, very bad odor.

hours, after which the oxidation was considered to be complete. The water present in the product was then stripped off by heating at 122–150° F., at 5 mm. Hg absolute pressure. The cloud point of the pure product was then determined for a 1% by weight aqueous solution. Higher cloud point temperatures are indicative of greater water solubility.

After the preparation of the sulfoxides, 500 p. p. m. of a commercial masking agent, sold under the trade name of Maskol 1216, were added to each sample.

The results of a number of these runs are tabulated above in Table II. The oxidation run numbers correspond with those of Table I in order to identify the condensation product used in each run of Table II.

In runs O–1 to O–14 the product was colorless and had little odor. Run O–15 illustrates the effect of alkaline conditions in the reaction mixture during the oxidation. The product comprised a yellow, insoluble oil having a very bad odor and was vastly different from the product of run O–15a in which no catalyst was used and the reaction mixture was neutral. All of the previous runs except for run O–11, a neutral run, were under acid conditions. This indicates that maintaining the reaction mixture at a pH of no more than 7 is essential to the production of suitable sulfoxide product.

EXAMPLE III

The compounds of runs 1 to 14 of Table I of the general formula $$R-\overset{O}{\underset{\|}{S}}-(CH_2-CH_2-O)_nH$$

were tested as detergents for nylon and wool by the following procedure.

One hundred milliliters of a 0.25 weight percent aqueous solution of the compound to be tested, 8 rubber balls (⅜″ diameter), and two swatches, each 3″ x 2″, of standard solided nylon or wool were charged to a jar. Twenty jars, thus prepared, were placed on a machine which rotated the jars at 40 revolutions per minute. The temperature of the jar contents was maintained at 43° C. (109.4° F.) for the nylon runs, and 60° C. (140° F.) for the wool runs. The jars were rotated for 15 minutes. The swatches were then removed and placed in another jar with 150 milliliters of water of the same hardness as the water used in the washing. The jars were then rotated on the machine previously described for 2 minutes to rinse the swatches. The swatches were then removed and examined on a Hunter Multipurpose Reflectometer to determine their brightness value. The reflectometer had previously been set to read 100 on a magnesium block. A number of duplicate runs were made on each compound. The results of these tests are presented below in Table III wherein the run numbers correspond with those of Tables I and II. The test procedure described above is essentially the same as described on pages 354 and 355 of Surface Active Agents, Schwartz and Perry, Interscience Publishers Inc., New York (1949).

Table III

| Run No. | $R-\overset{O}{\underset{\|}{S}}-(CH_2-CH_2-O)_nH$ Compound | | Brightness Units | | | |
|---|---|---|---|---|---|---|
| | | | Nylon Detergency | | Wool Detergency | |
| | R (alkyl) | n | Washing in 2-Grain Water | Washing in 15-Grain Water | Washing in 2-Grain Water | Washing in 15-Grain Water |
| T-1 | tert-$C_{12}$ | 4 | 2.5 | 1.5 | 1.0 | 2.6 |
| T-2 | tert-$C_{12}$ | 6 | <1.0 | <1.0 | 3.9 | 3.7 |
| T-3 | tert-$C_{12}$ | 8 | <1.0 | <1.0 | 2.2 | 2.3 |
| T-4 | tert-$C_{14}$ | 3 | [1]0 | [1]0 | 5.9 | 5.5 |
| T-5 | tert-$C_{14}$ | 5 | 24.5 | 10.5 | 23.7 | 18.7 |
| T-6 | tert-$C_{14}$ | 7 | 18.2 | 18.0 | 7.4 | 12.4 |
| T-7 | tert-$C_{16}$ | 3 | [1]0 | [1]0 | 7.0 | 7.5 |
| T-8 | tert-$V_{16}$ | 5 | [1]21.5 | [1]13.4 | 10.5 | 14.0 |
| T-9 | tert-$V_{16}$ | 7 | 22.9 | 20.8 | 21.0 | 27.5 |
| T-10 | n-$C_{12}$ | 4 | [1]21.8 | [1]21.0 | 29.2 | 31.6 |
| T-11 | n-$C_{12}$ | 5 | [1]18.6 | [1]20.4 | 29.4 | 30.1 |
| T-12 | n-$C_{12}$ | 6 | [1]15.5 | [1]13.6 | 18.3 | 18.1 |
| T-13 | n-$C_{16}$ | 5 | [1]26.7 | [1]28.4 | 30.8 | 34.4 |
| T-14 | n-$C_{18}$ | 5 | [1]6.9 | [1]11.5 | 23.0 | 24.4 |
| Control [2] | | | 8.2 | 16.5 | 7.4 | 20.0 |

[1] These numbers were determined by averaging the values from 8 swatches. All other values given were determined by averaging the values from 4 swatches.
[2] The control used was a commercial, concentrated, alkyl aryl sodium sulfonate sold under the trademark of "Nacconol NRSF."

The five best nylon and wool detergents of the formula $$R-\overset{O}{\underset{\|}{S}}-(CH_2-CH_2-O)_nH$$

are listed below along with their chemical names:

| R (alkyl) | n | |
|---|---|---|
| tert-$C_{14}$ | 5 | 14-hydroxy-3,6,9,12-tetraoxatetradecyl tert-tetradecyl sulfoxide. |
| tert-$C_{16}$ | 7 | 20-hydroxy-3,6,9,12,15,18-hexoxaeicosyl tert-hexadecyl sulfoxide. |
| n-$C_{16}$ | 5 | 14-hydroxy-3,6,9,12-tetraoxatetradecyl n-hexadecyl sulfoxide. |
| n-$C_{12}$ | 4 | 11-hydroxy-3,6,9-trioxahendecyl n-dodecyl sulfoxide. |
| n-$C_{12}$ | 5 | 14-hydroxy-3,6,9,12-tetraoxatetradecyl n-dodecyl sulfoxide. |

Certain modifications of the invention will become apparent to those skilled in the art and the illustrative details disclosed are not to be construed as imposing unnecessary limitations on the invention.

I claim:

1. A detergent composition, effective in cleaning nylon, wool, and mixtures thereof, when used in aqueous solution, represented by the formula $$R-\overset{O}{\underset{\|}{S}}-(CH_2-CH_2-O)_nH$$

wherein R is selected from the group consisting of normal alkyl radicals containing from 12 to 16 carbon atoms and tertiary alkyl radicals containing from 14 to 16 carbon atoms, and n is an integer in the range of 4 to 7.

2. A detergent composition of claim 1 wherein R is tertiary $C_{14}$, n is 5.

3. A detergent composition of claim 1 wherein R is tertiary $C_{16}$ and n is 7.

4. A detergent composition of claim 1 wherein R is normal $C_{12}$ and n is 4.

5. A detergent composition of claim 1 wherein R is normal $C_{12}$ and n is 5.

6. A detergent composition of claim 1 wherein R is normal $C_{16}$ and n is 5.

7. A process for preparing a detergent which comprises reacting an alkyl mercaptan of from 8 to 20 carbon atoms with an alkylene oxide of from 2 to 5 carbon atoms to form the corresponding glycol thioether; contacting the solution containing said glycol thioether at a pH of not more than 7 with an oxidizing agent selected from the group consisting of hydrogen peroxide and peracids under oxidizing conditions to form the corresponding sulfoxide in colorless form and of less odor than when produced at higher pH than 7; and recovering the sulfoxide from the reaction mixture.

8. The process of claim 7 wherein an alkaline catalyst is utilized in the mercaptan-alkylene oxide reaction and the reaction product mixture is neutralized with an acid.

9. The process of claim 7 wherein the mercaptan is selected from the group consisting of normal alkyl mercaptans of 12 to 16 carbon atoms and tertiary alkyl mercaptans of 14 to 16 carbon atoms and the alkylene oxide is ethylene oxide.

10. The process of claim 9 wherein the reaction between said mercaptan and ethylene oxide is catalyzed by a solution of NaOH in a low boiling alcohol and the reaction product mixture is neutralized with sulfuric acid.

11. A process for preparing a detergent represented by the formula

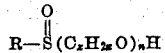

wherein R is selected from the group consisting of normal alkyl radicals containing from 12 to 16 carbon atoms and tertiary alkyl radicals containing from 14 to 16 carbon atoms, $n$ is an integer in the range of 4 to 7, and $x$ is an integer in the range of 2 to 5, which comprises reacting a mercaptan selected from the group consisting of normal alkyl mercaptans of 12 to 16 carbon atoms and tertiary alkyl mercaptans of 14 to 16 carbon atoms with an alkylene oxide of from 2 to 5 carbon atoms in an amount in the range of 4 to 7 mols of alkylene oxide per mol of mercaptan in admixture with an alkaline catalyst at a temperature in the range of 120 to 300° F. and at superatmospheric pressure to form a glycol thioether; adding acid to the reaction product mixture to bring the pH down to not more than 7; and admixing hydrogen peroxide with the resulting solution in sufficient quantity to oxidize substantially all of the glycol thioether to the detergent of said formula.

12. The process of claim 11 wherein the alkylene oxide is ethylene oxide and said alkaline catalyst comprises NaOH dissolved in a low boiling alcohol.

13. A process for cleansing a member of the group consisting of nylon, wool, and mixtures of nylon and wool, comprising washing same with an aqueous solution of a detergent represented by formula

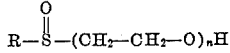

wherein R is selected from the group consisting of normal alkyl radicals containing from 12 to 16 carbon atoms and tertiary alkyl radicals containing from 14 to 16 carbon atoms, and wherein $n$ is an integer in the range of 4 to 7.

14. The process of claim 13 wherein R is tertiary $C_{14}$ and $n$ is 5.

15. The process of claim 13 wherein R is tertiary $C_{16}$ and $n$ is 7.

16. The process of claim 13 wherein R is normal $C_{12}$ and $n$ is 4.

17. The process of claim 13 wherein R is normal $C_{12}$ and $n$ is 5.

18. The process of claim 13 wherein R is normal $C_{16}$ and $n$ is 5.

References Cited in the file of this patent

UNITED STATES PATENTS

| | | |
|---|---|---|
| 2,494,610 | Davidson et al. | Jan. 17, 1950 |
| 2,571,157 | Olin | Oct. 16, 1951 |
| 2,586,767 | Wilson | Feb. 19, 1952 |

FOREIGN PATENTS

| | | |
|---|---|---|
| 809,373 | France | Mar. 2, 1937 |

OTHER REFERENCES

Shostakovskii et al.: Izvest Akad Nauk, SSSR, Otdel, Khim Nauk 1953, 357–67. Cited in Chemical Abstracts, 48, 9312b.